May 29, 1934.  B. H. T. MULCH  1,960,975
WATER COOLER AND FILTER
Filed June 23, 1932
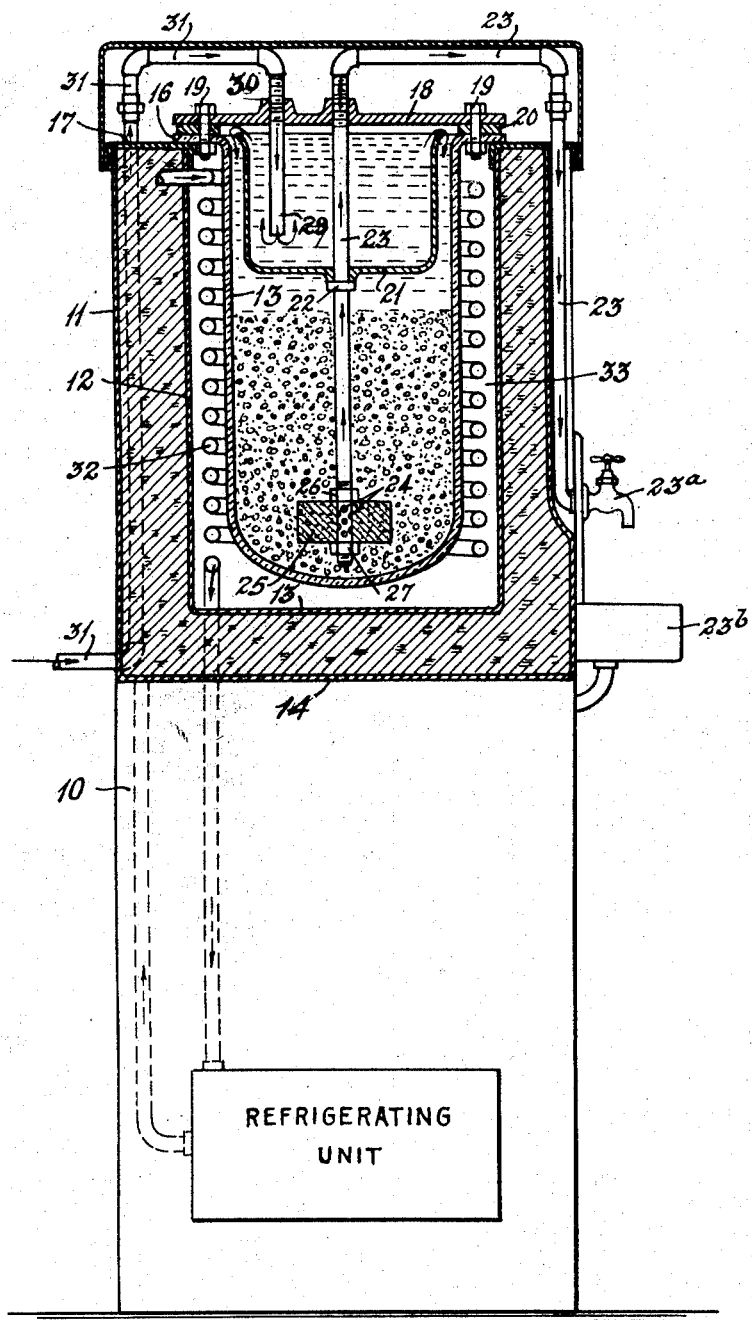
INVENTOR
B. H. T. MULCH
BY
*Joseph Hirschman*
ATTORNEY Patented May 29, 1934

1,960,975

UNITED STATES PATENT OFFICE 1,960,975

WATER COOLER AND FILTER

Balthazar H. T. Mulch, Westwood, N. J.

Application June 23, 1932, Serial No. 618,829

9 Claims. (Cl. 210—101)

My invention relates to apparatus for cooling and filtering water, and particularly to apparatus suitable for use in office buildings, and in public places for cooling and filtering drinking water.

It is an object of the invention to provide an efficient filtering and cooling apparatus which is simple and compact in construction and can be manufactured at a low cost. It is also an object of the invention to provide an automatic cooler and filter wherein the arrangement is such that the water at the walls of the tank containing the filter bed is frozen to form a seal between such filter bed and the said walls, whereby leakage along the walls is prevented and the water compelled to flow through the filter bed. It is also an object of the invention to provide an improved apparatus of the type indicated which is adapted to be associated with an electrically or gas-operated refrigerator, and wherein the control of the motor or the gas supply of the refrigerator is effected in dependence upon the temperature of what may, for convenience, be termed a cold-accumulating body of water or brine independent of the water being filtered, whereby frequent turning on and off of the current of electricity or gas is avoided. In furtherance of the last mentioned object, the cooling coils are surrounded by a body of water whereby there is formed during the operation of the apparatus a body of ice around the said coils and around the filter bed which operates to cool the water flowing into the apparatus even after the feed of refrigerant to the coils has ceased. It is a further object of the invention to provide a combined filtering and cooling device wherein the water is compelled to move downwardly through the filter bed so as to compact the filtering matter; and wherein the water is cooled prior to its entry into the filter bed so as to keep such bed at a low temperature and thus discourage the growth of germs therein, the water being again cooled before delivery to the dispensing mechanism of the apparatus.

A preferred embodiment of the invention is shown by way of example on the accompanying drawing which shows a central section through a combined water cooler and filter associated with an automatic refrigerator.

In said drawing the numeral 10 indicates a casing of any suitable sheet metal such as copper or galvanized iron, or of any other appropriate material. The upper portion of the casing may consist of a container or shell 11 of rectangular or other form the same being double walled, the inner wall 12 enclosing in spaced relation a tank 13 which may be of porcelain or enameled iron. Between the vertical walls 11 and 12 and the horizontal walls 13 and 14 of the container 11 is positioned a body of heat-insulating material such as cork or other suitable substance. The tank 13 is provided at its upper edge with an outwardly extending horizontal flange 16 which is adapted to rest upon the top plate 17 of the container 11. The top of tank 13 is sealed by a plate 18 secured to the flange 16 by bolts 19, a suitable packing 20 being interposed between such plate and flange.

A cup 21 whose external diameter is smaller than the internal diameter of the tank 13 is positioned within the latter in such manner that the upper edge of the cup is spaced a short distance from the sealing plate 18. The cup may be supported upon a fixed collar 22 on a discharge pipe 23 passing through the plate 18 and extending nearly to the bottom of tank 13. Toward the bottom end thereof the pipe 23 is provided with a plurality of openings 24 distributed about the pipe, such openings being covered by a filter block 25 of carbon clamped to the pipe, the block being held between two nuts 26 and 27 which are threaded upon the pipe. It will be understood that the pipe is of reduced external diameter at the openings 24 to enable the nut 26 to be brought into engagement with the upper threaded portion of the pipe. The bottom end of the pipe 23 is sealed, as by means of a plug or in any other desired manner.

The major portion of the tank 13 below the cup 21 is filled with a porous filter bed 28 of bone carbon and quartz or other known material. A lead-in pipe 29 is threaded through the plate 18 and a boss 30 thereon, and opens into the lower portion of the cup 21. The pipe 29 is connected by pipe 31 with a suitable source of water, such as the water tank at the top of a building, a water main, etc.

Between the wall 12 of the insulating casing 11 and the water tank 13, is arranged a cooling coil 32 which receives a refrigerant, such as cold vapor from an expansion valve (not shown) to which flows a condensed volatile liquid of the type commonly employed in refrigerating machines, cooled brine, etc. The space 33 in which the cooling coil 32 is arranged is adapted to be filled with water for a purpose to be explained hereinbelow, and the coil is preferably placed close to the tank 13. The pipe 23 is connected with a faucet 23a through which the cooled and filtered water is supplied, a drain pan 23b being provided to conduct the waste water to a suitable receptacle (not shown) in any known or approved manner.

The pipe 31 may either pass through the tank 11, or it may pass through the triangular space produced at a corner of the container 11 by an oblique partition cutting such corner. The pipe leading from the temperature control element, such as a thermostatic bulb (not shown) and arranged within the space 33, such pipe leading to the refrigerating unit to control the operation thereof, may be arranged within a similar triangular corner space at another corner of the container 11.

In the operation of my improved cooling and filtering apparatus, the water enters through pipe 31 from the source of supply and then passes through pipe 29 into the cup 21 where it is cooled. From the latter is overflows into the tank 13 and then passes through the filter bed 28 where it is cleaned and further chilled, after which it is compelled to pass through the carbon block 25, which removes any traces of color or odor, and through openings 24 into pipe 23 by which it is carried through the water-filled cup 21. From the pipe 23 the cooled and filtered water flows to the faucet 23a.

It will be noted that the course of the water is such that it flows downwardly through the filter bed 28 and thus tends to compress or pack such filter bed and improve the efficiency thereof.

Moreover, the cooling or expansion coil 32 is located so near to the tank 13, that the water along the inner wall of the tank and within the filter bed 28 is frozen at such wall to the depth of about one-half inch. There is thus automatically formed an annular seal of ice which prevents the water overflowing from cup 21 from taking the path of least resistance along the inner wall of tank 13 and thus by-passing the filter bed and compels such water to pass through the deep mass of filtering material before it reaches the carbon block 25.

Due to the fact that the coil 32 is surrounded by a body of water or of brine, the latter becomes frozen and there is thus provided a body of ice within the space 33. This ice tends to keep the water within cup 21 and tank 13 cool and performs such function even through the refrigerating unit is idle and the coil 32 is not fed with refrigerant. The temperature control bulb or other control device will therefore not set the refrigerator unit into operation until after this body of ice has melted. As a result, the refrigerating unit is set into operation only after comparatively long intervals, the body of water in space 33 operating to store a quantity of "cold" which prevents the temperature control mechanism from starting and stopping the refrigerating unit at short intervals when the temperature of the water within the cup 21 or tank 13 fluctuates rapidly.

It will be noted that in my improved apparatus the water is cooled before it is filtered, and is cooled again after the filtration as it passes through the cup 21. The initial cooling of the water is of advantage as it discourages the growth of germs, increases the efficiency of the filter, and thus makes replacement of the filter bed less frequently necessary.

It will be apparent that certain features of my improved apparatus may be used without others, and that various modifications may be resorted to within the scope of the appended claims without departing from the spirit of the invention.

I claim:

1. A water cooler and filter comprising, in combination, a container, a tank positioned within said container in spaced relation thereto, a bed of filtering material within said tank, a cooling coil arranged within the space between the container and tank and adapted to cool the filter bed in the vicinity of the wall of the tank, said cooling coil being located in close proximity to the walls of the tank and adapted to receive a refrigerant of low temperature to effect freezing of water along the inside surface of the tank and thereby form an ice seal along the sides of the filter bed at such tank, a conduit for delivering water to the top of said filter bed, and a conduit for withdrawing the cooled and filtered water.

2. A water cooler and filter comprising, in combination, a container, a tank positioned within said container in spaced relation thereto, a bed of filtering material within said tank, a cooling coil arranged within the space between the container and tank and adapted to cool the filter bed in the vicinity of the wall of the tank, a cup arranged within the tank with its walls spaced from the walls of the latter, a conduit leading to approximately the bottom of such cup for delivering water thereto for cooling therein prior to the passage of the water through the filter bed, such cooled water flowing over the upper edge of said cup through the space between the cup and tank onto the filter bed, and a conduit leading from the bottom of the filter bed for withdrawing the cooled and filtered water.

3. A water cooler and filter comprising, in combination, a container, a tank positioned within said container in spaced relation thereto, a bed of filtering material within said tank, a cooling coil arranged within the space between the container and tank and adapted to cool the filter bed in the vicinity of the wall of the tank, a cup arranged within the tank, a conduit leading to approximately the bottom of such cup for delivering water thereto for cooling therein prior to the passage of the water through the filter bed, such cooled water flowing over the upper edge of said cup onto the filter bed, and a conduit leading from the bottom of the filter bed for withdrawing the cooled and filtered water, said last-mentioned conduit passing through the cup so that the water in such conduit flows in heat-exchange relation with the water in the cup.

4. A water cooler and filter comprising, in combination, a container, a tank positioned within said container in spaced relation thereto, a bed of filtering material within said tank, a cooling coil arranged within the space between the container and tank and adapted to cool the filter bed in the vicinity of the wall of the tank, a cup arranged within the tank, a conduit leading to approximately the bottom of such cup for delivering water thereto for cooling therein prior to the passage of the water through the filter bed, such cooled water flowing over the upper edge of said cup onto the filter bed, and a conduit leading from the bottom of the filter bed for withdrawing the cooled and filtered water, said cup being supported upon said last-mentioned conduit, and the latter passing through the cup.

5. The combination as set forth in claim 1, including a carbon block arranged in the path of the water between the filter bed and the second-mentioned conduit.

6. The combination as set forth in claim 1, including a carbon block associated with the inlet end of the second-mentioned conduit and so arranged that the water is compelled to pass through the block before entering such conduit.

7. The combination as set forth in claim 1, wherein the second-mentioned conduit is perforated near its inlet end, the bottom end of such conduit being closed, and a carbon block mounted upon such conduit and surrounding the perforations therein.

8. The combination as set forth in claim 1, wherein the space between the container and the tank is sufficiently large to receive a body of water about the cooling coils.

9. A combined water cooler and filter comprising a double-walled container provided with a mass of insulating material between the walls thereof, a tank positioned within said container in spaced relation to the inner wall of the latter, a cooling coil within the space between the container and tank, said space being sufficiently large to receive a body of water about said coils, said coils being arranged close to the walls of the tank, a bed of filtering material filling the lower portion of said tank, a discharge conduit leading from the bottom of said filter bed and passing through such bed, a cup supported upon such conduit, the latter passing through said cup, means for sealing said tank, a supply conduit leading to the bottom of said cup and adapted to feed water thereinto, said cup so arranged that the water flows over the top thereof onto the filter bed, said discharging conduit being closed at its lower end and being provided with a plurality of perforations adjacent to such ends, and a carbon block mounted upon said conduit and covering the perforations therein.

BALTHAZAR H. THEO. MULCH.